(12) United States Patent
Askerdal et al.

(10) Patent No.: US 10,399,786 B2
(45) Date of Patent: Sep. 3, 2019

(54) CONVEYOR SUPPORT RAIL ATTACHMENT, SUPPORT RAIL AND CONVEYOR

(71) Applicant: FlexLink AB, Göteborg (SE)

(72) Inventors: Magnus Askerdal, Hajom (SE); Josef Snabb, Göteborg (SE)

(73) Assignee: FlexLink AB, Göteborg (SE)

( * ) Notice: Subject to any disclaimer, the term of this patent is extended or adjusted under 35 U.S.C. 154(b) by 0 days.

(21) Appl. No.: 15/760,480

(22) PCT Filed: Sep. 14, 2016

(86) PCT No.: PCT/SE2016/050858
§ 371 (c)(1),
(2) Date: Mar. 15, 2018

(87) PCT Pub. No.: WO2017/048179
PCT Pub. Date: Mar. 23, 2017

(65) Prior Publication Data
US 2018/0257867 A1    Sep. 13, 2018

(30) Foreign Application Priority Data
Sep. 16, 2015 (SE) ...................... 1551189

(51) Int. Cl.
*B65G 21/22* (2006.01)
*B65G 15/62* (2006.01)

(52) U.S. Cl.
CPC .............. *B65G 21/22* (2013.01); *B65G 15/62* (2013.01); *B65G 2207/26* (2013.01)

(58) Field of Classification Search
CPC ..... B65G 21/22; B65G 2207/26; B65G 15/62
(Continued)

(56) References Cited

U.S. PATENT DOCUMENTS

| 853,815 | A | * | 5/1907 | MacLaughlin | ........ B65G 21/22 |
| 1,647,665 | A | * | 11/1927 | Riche | ...................... A47F 10/06 |
| | | | | | 193/38 |

(Continued)

FOREIGN PATENT DOCUMENTS

| DK | 176873 B1 | 2/2010 |
| GB | 1572376 A | 7/1980 |

(Continued)

OTHER PUBLICATIONS

"International Application No. PCT/SE2016/050858, International Search Report dated Dec. 12, 2016", (Dec. 12, 2016), 5 pgs.

(Continued)

*Primary Examiner* — Mark A Deuble
(74) *Attorney, Agent, or Firm* — Schwegman Lundberg & Woessner, P.A.

(57) ABSTRACT

Conveyor support rail attachment, comprising a plurality of attachment means arranged spaced apart along a longitudinal center axis, where every second attachment means is arranged on a left side of the center axis and every other attachment means is arranged on a right side of the center axis, and where each attachment means is provided with a bearing surface adapted to bear against a side section of a support rail, such that the support rail is supported only on one side at each attachment means. The advantage of the invention is that a support rail can easily be mounted to and removed from the conveyor support rail attachment, and further that the bearing surface between the support rail and the attachment means can be minimized. This allows for a support rail that is easy to clean.

12 Claims, 4 Drawing Sheets

(58) Field of Classification Search
USPC .................................................... 198/841
See application file for complete search history.

(56) References Cited

U.S. PATENT DOCUMENTS

| | | | | |
|---|---|---|---|---|
| 2,969,870 | A * | 1/1961 | Pulver | A21B 1/48 198/814 |
| 4,479,574 | A * | 10/1984 | Julius | B65G 15/50 134/125 |
| 4,856,646 | A * | 8/1989 | Sjostrand | B65G 21/06 198/836.1 |
| 5,082,108 | A * | 1/1992 | Douglas | B65G 21/06 198/836.4 |
| 5,190,145 | A * | 3/1993 | Ledginham | B65G 21/22 198/841 |
| 5,310,047 | A * | 5/1994 | Ledingham | B65G 15/62 198/841 |
| 6,523,679 | B1 | 2/2003 | Manchester | |
| 6,796,418 | B1 * | 9/2004 | Harrison | B65G 21/06 198/778 |
| 7,114,615 | B1 | 10/2006 | Karpy | |
| 7,753,194 | B1 | 7/2010 | Jager et al. | |
| 2002/0063044 | A1 | 5/2002 | Reatti | |
| 2005/0241332 | A1 | 11/2005 | Kamm | |
| 2006/0096843 | A1 | 5/2006 | Hosch et al. | |
| 2009/0008225 | A1 | 1/2009 | Call et al. | |
| 2012/0018283 | A1 | 1/2012 | Dallner et al. | |

FOREIGN PATENT DOCUMENTS

| | | |
|---|---|---|
| JP | 2004115142 A | 4/2004 |
| WO | WO-2006122204 A2 | 11/2006 |

OTHER PUBLICATIONS

"International Application No. PCT/SE2016/050858, Written Opinion dated Dec. 12, 2016", (Dec. 12, 2016), 7 pgs.

* cited by examiner

CONVEYOR SUPPORT RAIL ATTACHMENT, SUPPORT RAIL AND CONVEYOR

PRIORITY APPLICATIONS

This application is a U.S. National Stage Filing under 35 U.S.C. 371 from International Application No. PCT/SE2016/050858, filed on Sep. 14, 2016, and published as WO2017/048179 on Mar. 23, 2017, which claims the benefit of priority to Swedish Application No. 1551189-2, filed on Sep. 16, 2015; the benefit of priority of each of which is hereby claimed herein, and which applications and publication are hereby incorporated herein by reference in their entirety.

TECHNICAL FIELD

The present invention relates to an attachment for a support rail adapted to be used in conveyor systems, both for easy to clean conveyors and for ordinary conveyor systems. The attachment for a support rail is adapted to simplify the cleaning of the conveyor system.

BACKGROUND ART

Conveying devices, such as those which are used for moving objects between different stations in a factory, usually comprise a conveying track comprising a belt or a chain. A conveyor track consists of an endless conveyor chain or belt that is supported by conveyor beams. The conveyor chain or belt glides on sliding surfaces on the conveyor beams in order to reduce the friction and the wear. This surface may be the conveyor beam itself or may be an additional component, such as a slide rail. The conveyor track may comprise curves and bends and at the end regions of a conveyor track, there is either a drive unit which drives the chain or an idler end unit which supports the chain for the return path.

There are a number of different designs for such conveyors available. Products may either be conveyed directly on the conveyor belt or chain, or may be conveyed on product carriers. A conveyor chain is made up of a large number of individual chain parts, designed to be able to support the conveyed products. A conveyor system is adapted to different types of products. For some products, such as medical equipments or in lab automation, the environment is clean and dust free, whereas for other products, the environment may be dusty, wet and/or messy. In these cases, it is important that it is relatively easy to clean the conveyor in order to reduce wear of the conveyor and to ensure a reliable operation.

One such industry is the food industry, where various requirements regarding cleanliness are imposed on the handling of goods, mainly to ensure good sanitary conditions in the manufacturing or packaging process. This is necessary to ensure that the food products are not contaminated. Depending on the type of food products, more or less hygienic demands are imposed. In order to meet these requirements, a number of measures are often taken. These include different cleaning schemes, including e.g. cleaning parts of the conveyor at regular intervals, with a more thorough cleaning at less frequent intervals. These may include partly disassembling the conveyor system at regular intervals, and removing the chain or belt to allow cleaning the conveyor system and chain.

It is thus of advantage to provide a system containing components that are easy to clean and that allow for the complete system to be easily and thoroughly cleaned. Such components are preferably made without slits or crevices where contaminations can enter. It is further of advantage that the components are easy to remove which makes it easier to reach all surfaces of the system when cleaning.

US 20120018283 A1 describes a conveyor in which the conveyor belt is supported by removable longitudinal runners. The side guards, the belt guards, the conveyor belt and the longitudinal runners are removed in order to clean the conveyor. In this way, the interior of the conveyor can be cleaned.

While this solution makes the conveyor system easier to clean, it requires partial disassembly of the conveyor system, which takes a lot of time, effort and manpower. Another problem with the removal of parts is that the parts must be kept somewhere during the cleaning. There is also a risk that fasteners or other parts are lost and not replaced, which may lead to malfunction of the conveyor system.

GB 1572376 A describes a conveyor for a table top chain comprising support rails arranged in a serpentine fashion. The support rails are attached to angled cross member brackets, where the upper flange is provided with slots adapted to hold the support rails. The support rails are provided with longitudinal grooves which are adapted to fit in the slots of the flanges. Due to the bent nature of the support rails, and to the longitudinal extension of a slot, each support rail will bear against one side of a slot at one end of the flange and on the other side of the slot at the other end of the flange. The support rail will thus be supported on both sides of the support rail at each flange. Each support rail is adapted to be easy to replace when worn. The guide rails are bolted to a cross member at one end.

This solution allows guide rails that are worn to be replaced, but is not suitable for daily removal in order to clean the parts of the conveyor. In order to be able to clean such a conveyor, the guide rails must be removed.

US 20050241332 A1 describes a conveyor, in which a conveyor belt is supported by a frame on which straight sliding rails are mounted to reduce friction. The sliding rails comprise recesses and are designed as self-supporting elements placed on transverse bars of the supporting frame.

Even if the described systems may function for some uses, there is still room for an improved conveyor support rail attachment.

DISCLOSURE OF INVENTION

An object of the invention is therefore to provide an improved conveyor support rail attachment. A further object of the invention is to provide an improved support rail for a conveyor, which facilitates the cleaning of the conveyor.

The solution to the problem according to the invention is described in the claims with regards to the attachment and to the support rail.

In a conveyor support rail attachment, comprising a plurality of attachment means arranged spaced apart along a longitudinal centre axis, the object of the invention is achieved in that every second attachment means is arranged on a left side of the centre axis with a distance a, and every other attachment means is arranged on a right side of the centre axis with a distance b, and where each attachment means is provided with a bearing surface adapted to bear against a side section of a support rail, such that the support rail is supported only on one side at each attachment means.

By this first embodiment of the conveyor support rail attachment according to the invention, an attachment for support rails which allows for an easy cleaning of a conveyor is provided. The attachment allows for cleaning the support rail and the attachment without removing the support rail. Since there are less contact points than in regular support rail attachments, there are less hidden areas to clean. Since the support rail is not fixedly attached by the attachment means, it is possible to flex the support rail somewhat in a sideway direction, such that there will be a small gap between an attachment means and the support rail, which is now easy to clean. In this way, a thorough cleaning of the conveyor system is possible without having to remove the support rails.

A further advantage of this invention is that the support rail can be easily removed and mounted to the attachment. A further advantage is that the support rail can be removed and mounted from above. Such an attachment is well adapted for the use in the food industry, where high hygienic demands are required. In this way, regular washing can be made in an easy and time-efficient way. Such washing is made in regular time periods, e.g. once a day or every four hours.

In an advantageous development of the invention, the bearing surface of an attachment means is rounded. The bearing surface of an attachment means may be either convex or concave, depending on the support rail that is to be held by the attachment. In one preferred example, the bearing surface is spherical, such that the bearing surface between the attachment means and the support rail is minimized. The attachment will in this example comprise a plurality of spherical bearing surfaces, which are adapted to cooperate with a concave side section of a support rail. In this way, the contact surface between the attachment means and the guide rail will only consist of a thin line, which minimizes the possibility of contaminations to stick between the attachment and the support rail. This will further help to simplify the cleaning of the support rail and the attachment means.

The attachment means are provided on separate transverse rods of the conveyor. In this way, the attachment means will be separated in the longitudinal direction and will allow the support rail to be mounted from above, by bending the support rail somewhat, since each transverse rod will comprise an attachment means adapted to support the support rail on one side only.

The distance between the bearing surfaces of the attachment means relative a centre axis may correspond to the width of the waist of a support rail. The waist of a support rail is in the described examples measured at the same height as the centre axis of the support rail, where the waist is either wider or narrower than the rest of the support rail. The shape of the side sections of a support rail depends on the shape of the attachment means. The shapes preferably correspond to each other, such that the support rail is held securely in place. Other shapes of both the attachment means and the support rail are also possible. In this way, the support rail will be held in a straight manner. This is especially advantageous for side support rails, which comprise side supports adapted to support and guide a conveyor chain sideways. The distance between the bearing surfaces may also be less than the width of the waist, such that the support rail is mounted in a slight S-shape. This may be advantageous for reducing the wear of the conveyor chain.

The support rail comprises an upper support surface, a lower support surface and two side sections adapted to cooperate with the shape of the bearing surfaces of the attachment means. In this way, the support rail will be securely held in place by the attachment means. Since the support rail is not fixedly attached to the attachment, it can easily be removed and remounted from above. The support rail may be symmetrical or may comprise a side support. The upper and lower support surfaces may be plane or may be slightly convex.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims. References such as longitudinal, horizontal, vertical, right, left etc. refer to directions of a conveyor in normal use.

Figure 1:
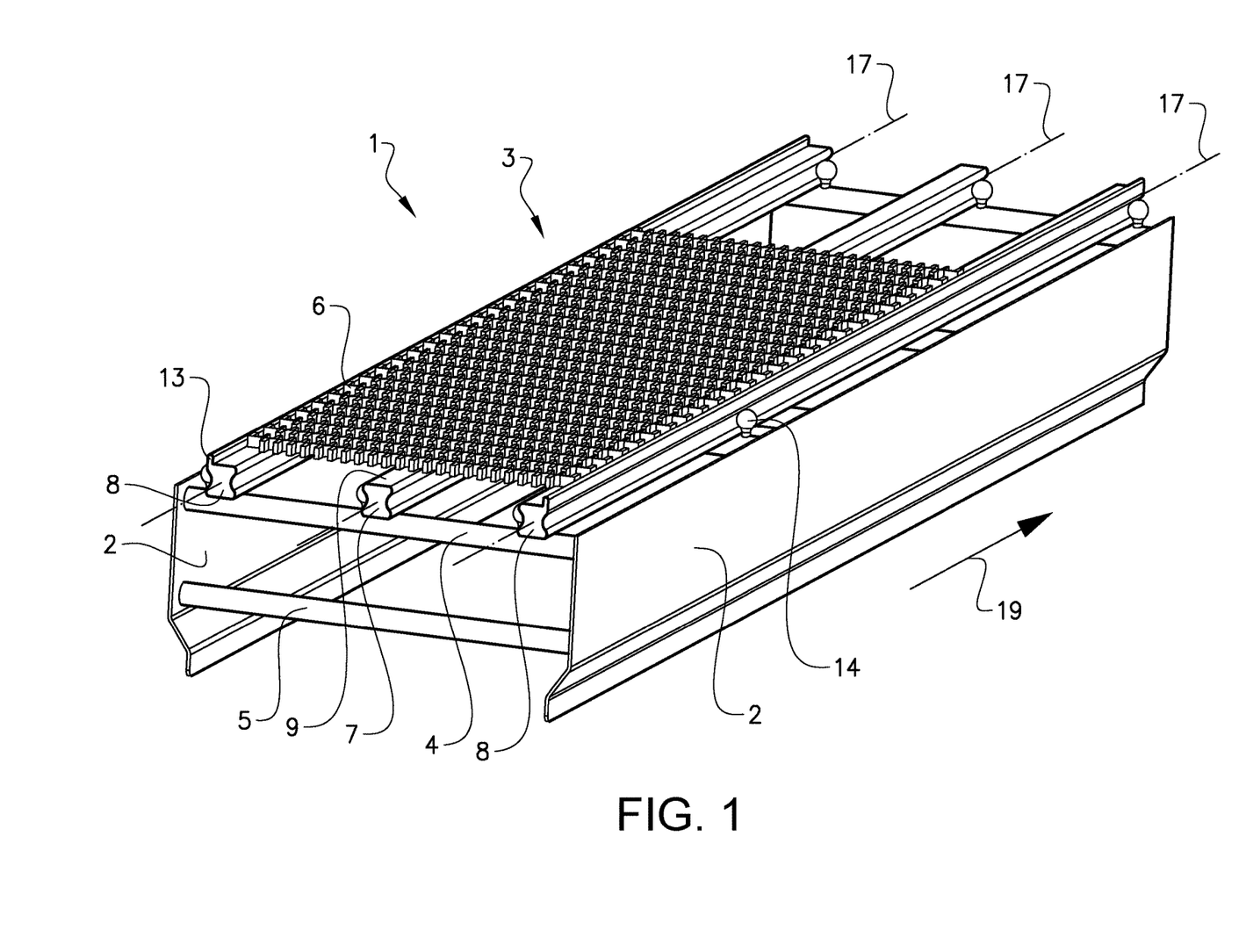
FIG. 1 shows a view of a conveyor comprising a conveyor support rail attachment and a support rail according to the invention.
Figure 2:
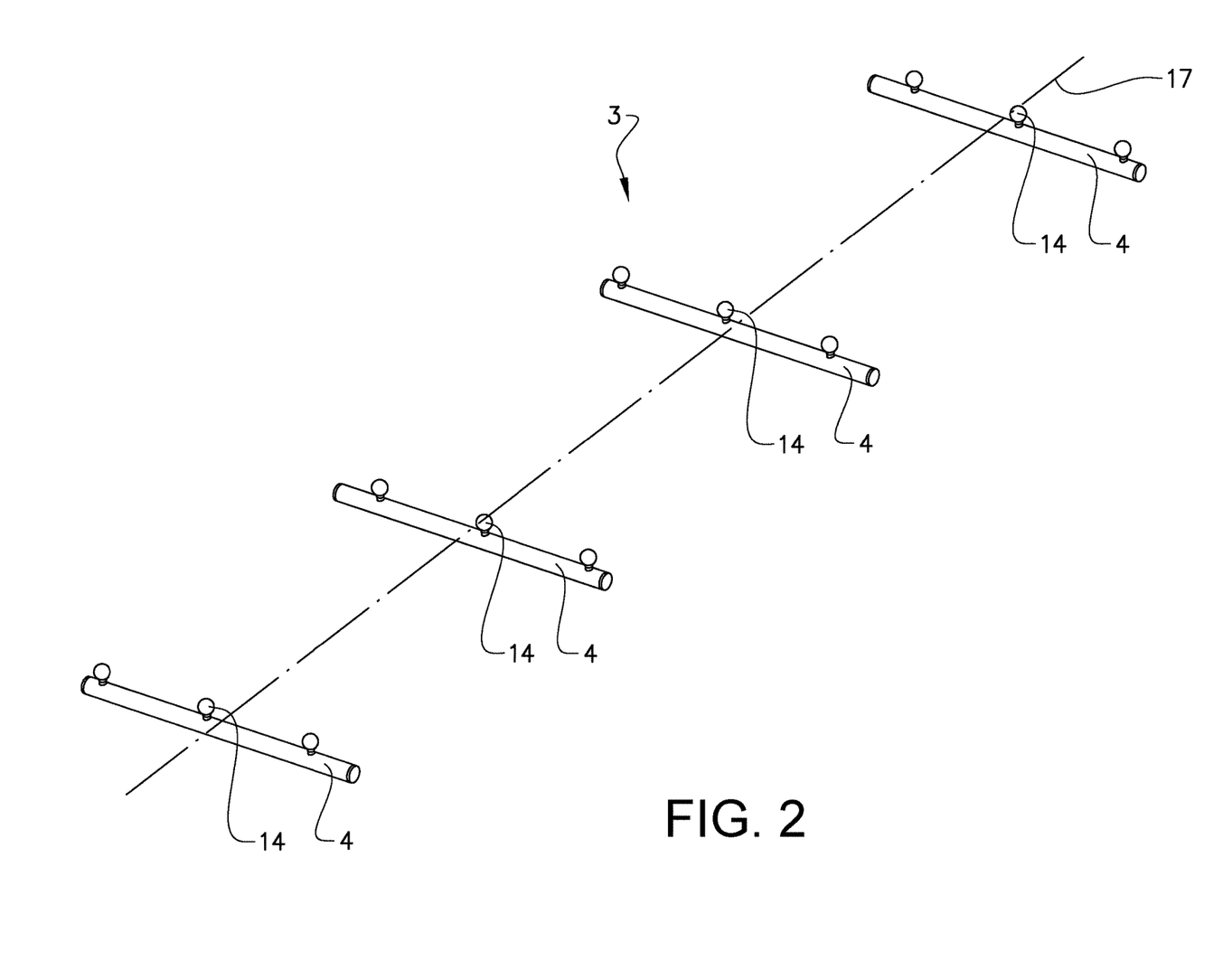
FIG. 2 shows a view of a conveyor support rail attachment according to the invention.
Figure 3A:
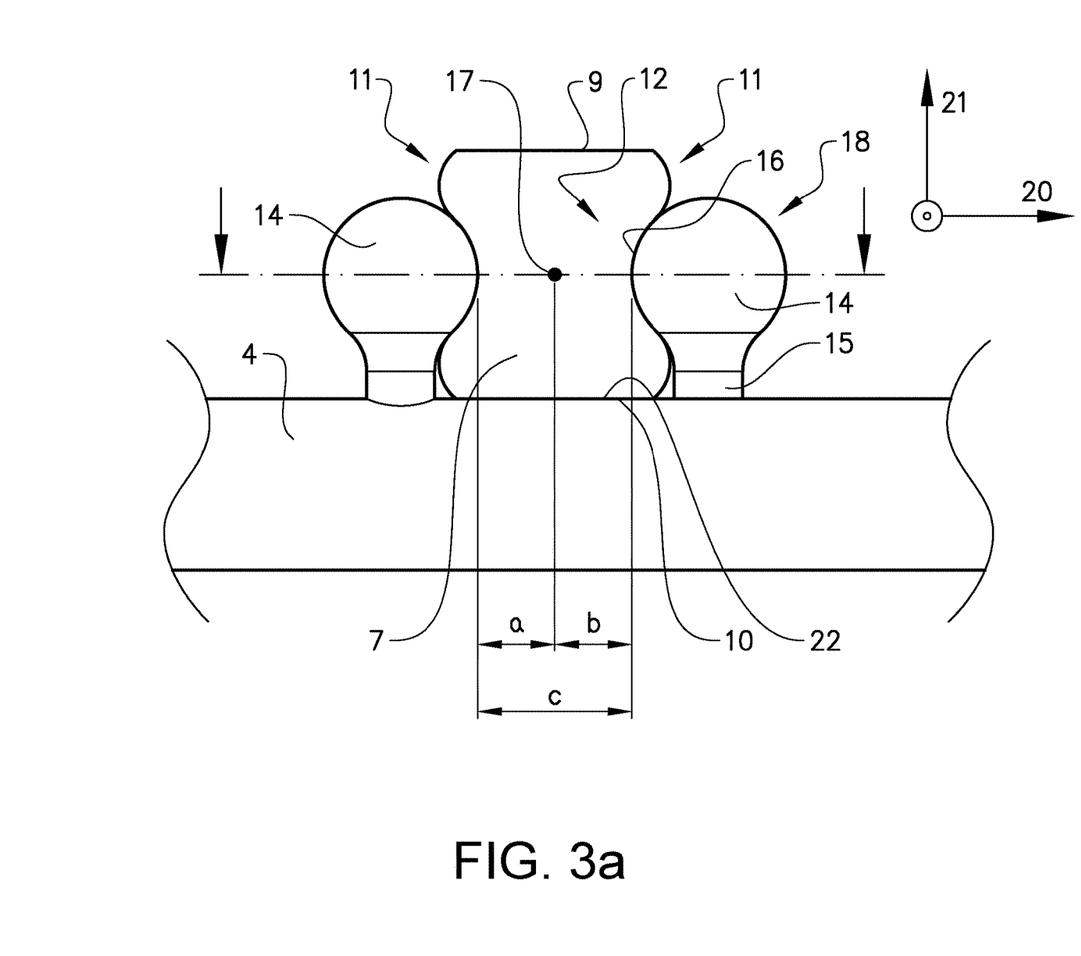
FIG. 3a shows a conveyor support rail attachment in a cut view.
Figure 4A:
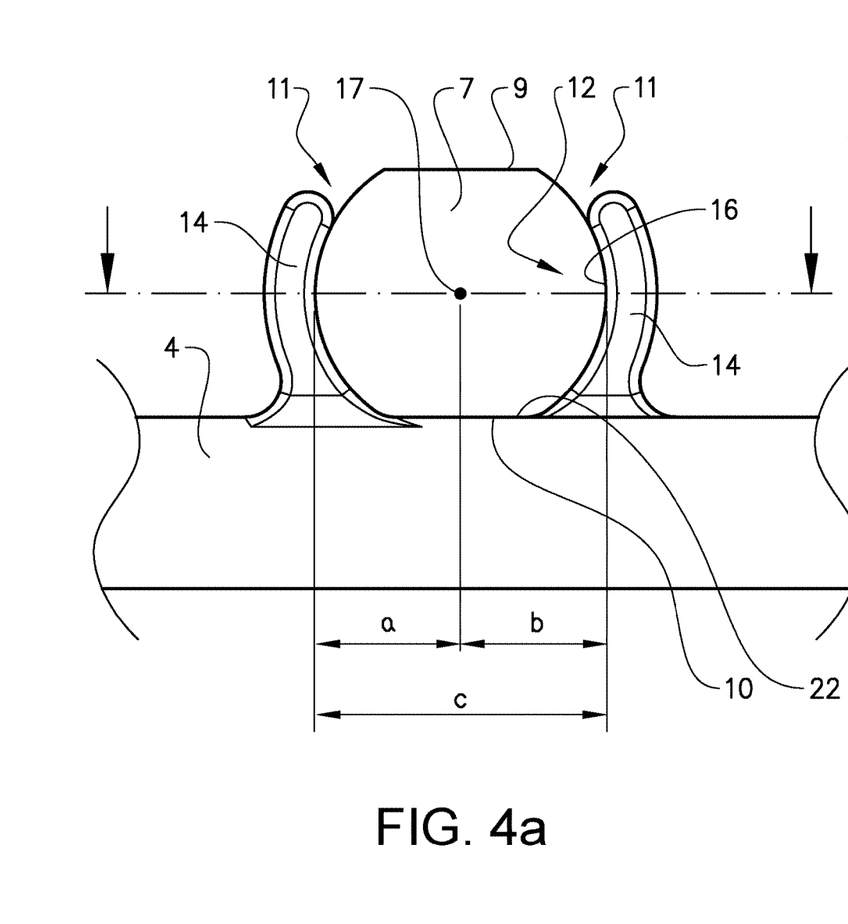
FIG. 4a shows another example of a conveyor support rail attachment in a cut view.

FIG. 1 shows a view of a conveyor comprising a conveyor support rail attachment according to the invention. FIG. 2 shows the conveyor support rail attachment, FIG. 3a shows the conveyor support rail attachment with a support rail in a vertical cut view, and FIG. 4a shows another example of a conveyor support rail attachment with a support rail in a vertical cut view. The conveyor 1 comprises two side walls 2. The side walls acts in this example both as longitudinal beams which hold the conveyor together and as protective covers which helps to prevent fingers and other objects to get caught in the conveyor chain. The conveyor further comprises a plurality of transverse rods 4 and 5 interconnecting the side walls and supporting the conveyor chain. The conveyor further comprises a drive unit in one end and an idler unit in the other end of the conveyor (not shown).

The transverse rods 4 are provided with support rails 7, which are adapted to support a conveyor chain or a wide belt assembled from a plurality of conveyor chain segments. Normally, a conveyor chain has a width of up to approximately 300 mm, and a wide belt has a width from 300 mm and more. The support rails provide a flat or slightly convex upper support surface for a conveyor chain or wide belt 6. The support rails are preferably made from a low friction material such that the conveyor chain can easily glide on the support rails. At the same time, the support rails must be relatively stiff such that they can support the conveyor chain and the transported goods. With a stiff support rail, the longitudinal spacing between two transverse rods 4 can be relatively long. The transverse rods 5 support the conveyor chain in the return path of the conveyor. The shown conveyor is also provided with side support rails 8, one on each side of the conveyor, which are adapted to support the conveyor chain also in a sideway manner.

The support rails 7 are held to the transverse rods by attachment means 14 in a removable manner, such that they are easily mounted and removed from above. In this way, the support rails can easily be removed for washing or replacement. A support rail 7 comprises an upper support surface 9, a lower support surface 10 and two side sections 11, which are concave in the shown example. The upper support surface is adapted to support a conveyor chain conveying products, such as food articles. The support surface of the support rail is preferably slightly convex, having a relatively large radius. In this way, a low friction between the support rail and the conveyor chain is provided. Further, the convex shape will allow cleaning water and other liquids to drain off the support rail in an efficient way. The lower support surface is preferably also slightly convex, which will minimize the contact surface between the support rail and the transverse rod.

The support rail 7 is preferably made from a single material having a low friction, but it would also be possible to manufacture the support rail in a two-component manner having a rigid inner section and a low friction outer lining completely covering the inner load carrying section. The inner load carrying section is in this case adapted to give rigidity to the support rail such that the distance between two transverse rods can be relatively long. When the support rail is made from only a low friction material, it may be machined or may be extruded. The side sections of the support rail are in the example shown in FIG. 3a provided with a concave shape adapted to cooperate with a convex bearing surface 16 of an attachment means, which may have a circular or spherical shape, such that a rounded bearing surface is obtained between the support rail and the attachment means. The side sections of a support rail may also be provided with a convex shape as shown in FIG. 4a, adapted to cooperate with a concave bearing surface 16 of an attachment means. Other corresponding shapes of the support rail and the attachment means are also possible.

The support rail is mainly adapted to support the underside of a conveyor chain. Such an example is shown as support rail 7 and comprises a straight or slightly convex upper surface. In this example, the support rail is symmetric along both a vertical axis 21 and a horizontal axis 20. This allows the support rail to be turned over such that both the upper and the lower support surface can be used to support the conveyor chain. A support rail 8 may also comprise a side support 13 and is in this example adapted to support the underside of a conveyor chain and at the same time to support the side of the conveyor chain, such that the conveyor is securely guided in a sideway direction. In this way, separate side guiding rails can be omitted.

The support rail is preferably made from a polyethylene, such as HDPE with or without additives. The upper and lower support surfaces are normally smooth, but it is also possible to provide the support surfaces with a pattern, e.g. for reducing friction or noise further or for providing dust removal from the bearing surface.

The support rail is held in place by a conveyor support rail attachment 3. The conveyor support rail attachment comprises a plurality of attachment means 14, arranged spaced apart along a centre axis 17 of the conveyor support rail attachment 3. The centre axis is parallel to the moving direction of the conveyor chain and coincides in the shown example with the centre of the support rail. The attachment means are arranged on separate transverse rods 4, such that each transverse rod comprises only one attachment means 14 each for every conveyor support rail attachment 3. In the example shown in FIG. 1 and FIG. 2, the conveyor comprises three conveyor support rail attachments 3, one central conveyor support rail attachment and two outer conveyor support rail attachments, where each outer conveyor support rail attachment is arranged at an outer side of the conveyor. A support rail is preferably provided with and end stop (not shown) at one end of the support rail, adapted to prevent the support rail to displace in the longitudinal direction. The end stop may be e.g. a hole in the lower support surface, adapted to cooperate with a pin mounted on a transverse rod.

The attachment means 14 are arranged spaced apart along the longitudinal centre axis 17 such that every second attachment means is arranged on a left side of the centre axis with a distance a, and every other attachment means is arranged on a right side of the centre axis with a distance b. The inner width of the conveyor support rail attachment will thus equal the distance a plus the distance b, as seen in a cut view projection according to FIG. 3a. In this way, the support rail will be supported only on one side at each attachment means. In FIG. 2, an example of the central conveyor support rail attachment is shown comprising four attachment means 14. In this example, the first and the third transverse rods are provided with attachment means 14 only at the left side of the centre axis 17, and the second and the fourth transverse rods are provided with attachment means arranged only on the right side of the centre axis 17.

Figure 3B:
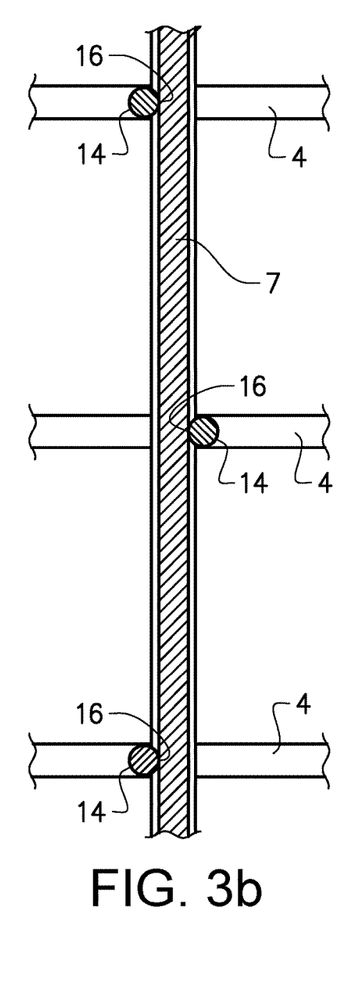
FIG. 3b shows the conveyor support rail attachment of 3a in a horizontal cut view.

FIG. 3a shows a cut view of a first example of a conveyor support rail attachment 3 with a support rail 7. Here, the left attachment means of the first transverse rod and the right attachment means of the second transverse rod can be seen, holding a support rail. In the shown example, the distance a plus the distance b corresponds to the width c of the waist 12 of the support rail and also of the inner width of the conveyor support rail attachment. In this way, the support rail will be held in a straight manner by the attachment means. The attachment means 14 may have a rounded or spherical outer surface, at least in the region creating the bearing surface to the support rail. In this way, a minimized contact surface is obtained, which minimizes the amount of contaminations that can hide at the contact surface. This also simplifies the cleaning of the conveyor. In the shown example, the attachment means is shaped as a sphere 18 having a shaft 15 which connects the sphere to the transverse rod. A spherical attachment is of advantage e.g. when an attachment means is produced separately, e.g. by turning in a lathe, and attached to the transverse rod e.g. by welding or gluing. The manufacture of a conveyor support rail attachment is simplified by having rotational symmetrical attachment means. FIG. 3b shows a horizontal cut view of a conveyor support rail attachment, where the rounded bearing surface 16 of the spherical attachment 14 can be clearly seen.

Figure 4B:
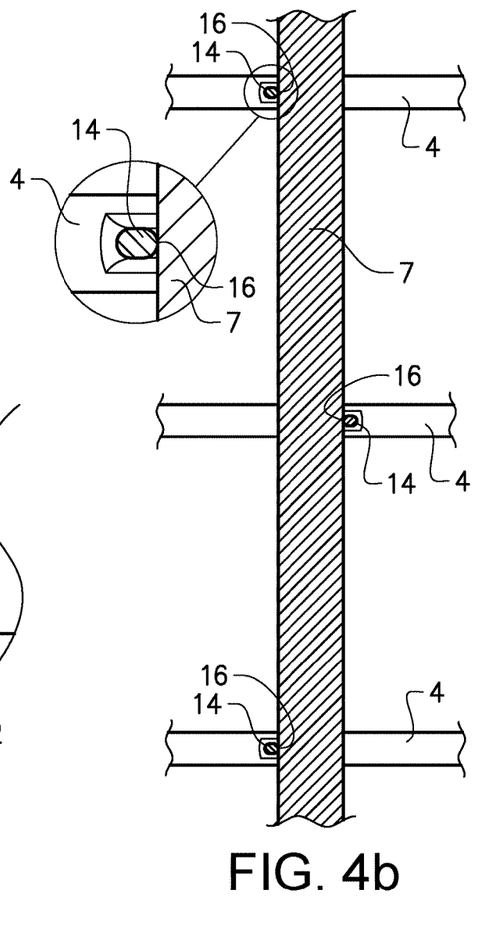
FIG. 4b shows the conveyor support rail attachment of 4a in a horizontal cut view.

FIG. 4a shows a cut view of another example of a conveyor support rail attachment 3 with a support rail 7. Also in this example, the left attachment means of a first transverse rod and the right attachment means of a second transverse rod are shown, holding a support rail. In the shown example, the side sections 11 of the support rail 7 are convex. The bearing surface 16 of the attachment means 14 is concave, such that it corresponds to the convex shape of the side section of the support rail. In the shown example, the distance a plus the distance b corresponds to the width c of the waist 12 of the support rail. In this way, the support rail will be held in a straight manner by the attachment means. The bearing surface 16 of the attachment means 14 may have a rounded or spherical shape at the region creating the bearing surface to the support rail. In this way, a minimized contact surface is obtained, which minimizes the amount of contaminations that can hide at the contact surface. In the shown example, the attachment means is arc shaped. In this example, the attachment means are cast together with the transverse rod. FIG. 4b shows a horizontal cut view of a conveyor support rail attachment, where the rounded bearing surface 16 of the arc shaped attachment 14 can be clearly seen.

The attachment means may also have other shapes, but it is preferred that the bearing surface to the support rail is rounded. It is e.g. possible to cast a transverse rod with attachment means in one casting cycle. In such a case, it may e.g. be of advantage to let the transverse rod and the attachment means have a somewhat flattened profile in order to save material. The attachment means may be produced separately and may be e.g. welded to a transverse rod.

The support rail is mounted in the conveyor support rail attachment from above. The support rail is first inserted between the two first attachment means and is then bent somewhat sideways back and forth such that it can be inserted between the other attachment means.

In another example, the distance a plus the distance b is less than the width c of the support rail. One purpose of using a relatively small difference is to provide a better hold of the support rail, since the support rail will be somewhat preloaded in the sideway direction. It is also possible to let the difference be larger, such that both distance a and distance b are zero or even negative. The advantage of such an arrangement is that the support rail will be held in a slight S-shape, which will reduce the wear on the underside of the conveyor chain.

The attachment means may be arranged on a transverse rod such that the same transverse rod can be used for all longitudinal positions. By rotating the transverse rod 180 degrees between each longitudinal position, the attachment means will in this way be positioned on either the left or the right side of the centre axis.

The conveyor support rail attachment and the support rail are preferably used for hygienic purposes, where it is important that the conveyor does not comprise any hidden spaces where contaminations, bacteria etc. can hide. Such conveyors must also be easy to clean. By allowing the support rail to be mounted and removed from above, the cleaning of the conveyor system is further simplified. It is also possible to clean the support rail and the attachment means without dismounting the support rail, by slightly displacing the support rail sideways such that a small gap is created between the support rail and an attachment means. The bearing surface can now easily be cleaned.

The invention is not to be regarded as being limited to the embodiments described above, a number of additional variants and modifications being possible within the scope of the subsequent patent claims. The guide rail may have any size and may be made from any suitable material. Other shapes of the bearing surfaces between the attachment means and the support rail are also possible.

REFERENCE SIGNS

1: Conveyor
2: Side wall
3: Conveyor support rail attachment
4: Transverse rod with attachment means
5: Transverse rod
6: Conveyor chain
7: Support rail
8: Side support rail
9: Upper support surface
10: Lower support surface
11: Side section
12: Waist
13: Side support
14: Attachment means
15: Shaft
16: Bearing surface of attachment means
17: Centre axis
18: Sphere
19: Longitudinal direction
20: Horizontal axis
21: Vertical axis
22: Convex bearing surface

The invention claimed is:

1. A conveyor support rail attachment, comprising a plurality of attachment means arranged spaced apart along a longitudinal centre axis which is parallel to the moving direction of the conveyor chain, characterized in that every second attachment means is arranged on a left side of the centre axis with a distance (a), and every other attachment means is arranged on a right side of the centre axis with a distance (b), and where each attachment means is provided with a bearing surface adapted to bear against a side section of a support rail, such that the support rail is supported only on one side at each attachment means, wherein the distance (a) plus the distance (b) is less than a width (c) of a waist of a support rail.

2. The conveyor support rail attachment according to claim 1, wherein the bearing surface of an attachment means is rounded.

3. The conveyor support rail attachment according to claim 1, wherein the bearing surface of an attachment means is spherical.

4. The conveyor support rail attachment according to claim 1, wherein each attachment means is arranged on a separate transverse rod.

5. The conveyor support rail attachment according to claim 4, wherein an attachment means is cast together with the transverse rod.

6. The conveyor support rail attachment according to claim 4, wherein an attachment means is a separate attachment means welded to the transverse rod.

7. The conveyor support rail attachment according to claim 4, wherein a transverse rod comprises a convex bearing surface adapted to support a lower support surface of a guide rail (7, 8).

8. A support rail adapted to be used with a conveyor support rail attachment according to claim 1, wherein the support rail comprises an upper support surface, a lower support surface and two side sections adapted to cooperate with the bearing surfaces of the attachment means, wherein the side sections are concave.

9. The support rail according to claim 8, wherein the upper support surface and the lower support surface are convex.

10. The support rail according to claim 8, wherein the support rail is symmetric along both a vertical axis and a horizontal axis.

11. The support rail according to claim 8, wherein a support rail comprises a side support.

12. A conveyor support rail attachment, comprising a plurality of attachment means arranged spaced apart along a longitudinal centre axis which is parallel to the moving direction of the conveyor chain, characterized in that every second attachment means is arranged on a left side of the centre axis with a distance (a), and every other attachment means is arranged on a right side of the centre axis with a distance (b), and where each attachment means is provided with a bearing surface adapted to bear against a side section of a support rail, such that the support rail is supported only on one side at each attachment means, wherein the distance (a) plus the distance (b) corresponds to a width (c) of a waist of a support rail.

* * * * *